United States Patent [19]

Chang

[11] Patent Number: 4,929,841

[45] Date of Patent: May 29, 1990

[54] DYNAMIC INFRARED TARGET

[75] Inventor: David B. Chang, Tustin, Calif.

[73] Assignee: Hughes Aircraft Company, Los Angeles, Calif.

[21] Appl. No.: 249,143

[22] Filed: Sep. 26, 1988

[51] Int. Cl.⁵ ............................................. G02F 2/00
[52] U.S. Cl. .............................. 250/504 R; 250/493.1
[58] Field of Search ................... 250/252.1 A, 504 R, 250/493.1

[56] References Cited

U.S. PATENT DOCUMENTS

| 3,735,137 | 5/1973 | Bly | 250/504 R |
|---|---|---|---|
| 4,655,607 | 4/1987 | Kern et al. | 250/342 |
| 4,705,952 | 11/1987 | Lindmayer | 250/484.1 |
| 4,794,302 | 12/1988 | Nire et al. | 313/498 |
| 4,820,929 | 4/1989 | Modisette et al. | 250/493.1 |

*Primary Examiner*—Bruce C. Anderson
*Attorney, Agent, or Firm*—Charles D. Brown; Wanda Denson-Low

[57] ABSTRACT

An inexpensive broadband dynamic IR target with a fast response time, good spatial resolution, and adequate dynamic range is disclosed. The IR target is made by coating a thin photo-conductive film on a transparent insulator. The emissivity of the film-substrate block is changed by irradiating the block with a visible image of the desired IR image. The image temperature varies from the block temperature T by an amount related to the photo-conductivity produced change in the emissivity.

15 Claims, 1 Drawing Sheet

DYNAMIC INFRARED TARGET

BACKGROUND OF THE INVENTION

The present invention relates to devices generating radiation in the infrared range (IR) to serve as IR targets for heat seeking detectors, and more particularly to a dynamic IR target wherein dynamic IR images having spatial infrared intensity variations are produced.

IR targets are in use today for such purposes as testing heat seeking missiles and IR tracking systems.

The conventional IR target is the Bly cell, which consists of a very thin membrane, typically of a material such as blackgold, irradiated by a visible image to produce a corresponding infrared image. Incident light energy is converted into heat energy (IR) by absorption. The Bly cell, however, does not have a fast response time or desired dynamic range, and is very fragile due to the thinness of the membrane.

Liquid crystal light valves have been employed in dynamic IR target systems. In the valve, the liquid crystal is backed by a photocell array. Voltages are created across the various portions of the liquid crystal according to the amount of light incident on that portion. Polarized IR radiation from a source illuminating the liquid crystal passes through the liquid crystal, and the plane of polarization of the IR is rotated by different amounts according to the voltage applied across the crystal. A cross polarizer is placed in the path of the IR which passes through the liquid crystal and which is reflected from an IR mirror backing the array. In this way a (polarized) IR image is formed. However, such systems are very expensive and exhibit less than perfect performance in terms of resolution, bandwidth, and response time.

It is understood that researchers at LTV, Inc. have attempted to employ a phase change in vanadium dioxide as a means for providing a dynamic IR target. When the vanadium dioxide is in the conducting phase it reflects IR well, but when it is in an insulating state, it does not reflect well. The phase change occurs close to room temperature. Thus, subjecting the different regions of the vanadium dioxide film to different temperatures results in a mirror for an IR source which has a position dependent reflectivity. In this way an IR image is produced. However, resolution and time response has not proven satisfactory.

It is therefore an object of the present invention to provide a relatively inexpensive, broadband dynamic IR target with a fast response time, good spatial resolution and adequate dynamic range.

SUMMARY OF THE INVENTION

A dynamic infrared target system is disclosed, wherein changes in the emissivity of a thin film are produced to simulate temperature variations. The system comprises an image light projector for projecting a light image representative of a desired infrared image. The system further includes an infrared target which includes a low-emissivity substrate transparent to infrared radiation and disposed with respect to the projected light image so that the image light impinges on a first surface of the substrate. The target further comprises a thin film of a photo-conductive material formed on a second surface of the substrate and having a thickness comparable to the skin depth of the infrared wavelength of interest. The light from the projector has a spatial intensity distribution forming the light image, which causes areas of the photo-conductive film to change from an insulating to a conducting state in a spatial pattern corresponding to the incident light image. The conductive areas of the film have a much lower emissivity than the nonconductive areas, thereby resulting in substantially reduced emitted radiation from the conductive areas. An infrared image is therefore simulated.

BRIEF DESCRIPTION OF THE DRAWING

These and other features and advantages of the present invention will become more apparent from the following detailed description of an exemplary embodiment thereof, as illustrated in the accompanying drawings.

DETAILED DESCRIPTION OF THE INVENTION

Figure 1:
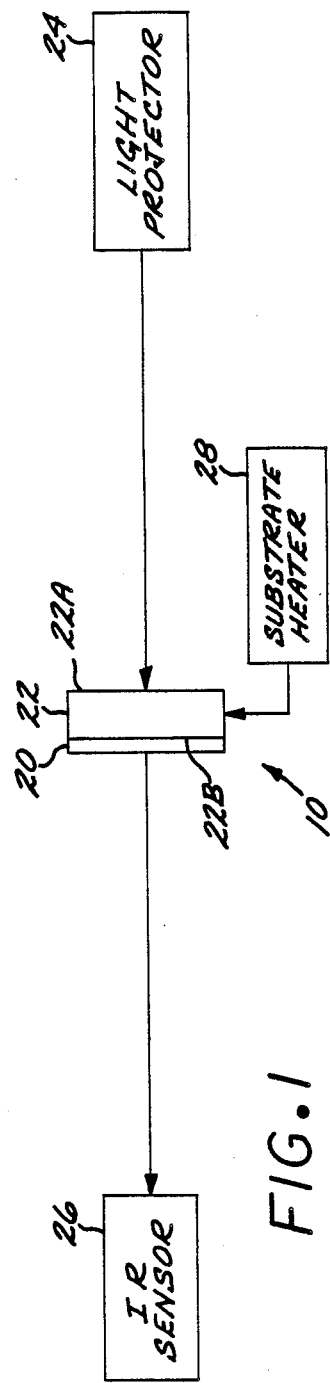
FIG. 1 is a simplified block diagram illustrating a dynamic IR target system embodying the invention.

The dynamic IR target system 10 embodying the invention is illustrated in FIG. 1, and employs emissivity changes of a thin film to simulate temperature changes. The emissivity is determined by the state of a thin photo-conductive film 20 deposited on the surface of a substrate 22 of a transparent insulator material.

The emissivity of an insulator is on the order of unity, while the emissivity of an electrical conductor such as metal is much less than unity. The amount of total radiation energy emitted by a body per unit area per unit time is proportional to $\epsilon \sigma_{SB} T^4$, when $\epsilon$ represents the emissivity, $\sigma_{SB}$ represents the Stephan-Boltzman coefficient, and T represents the temperature of the body. Thus, the amount of energy radiated is dependent on the emissivity of the body as well as its temperature. By selectively varying the emissivity of the emitting body, the total amount of energy radiated can also be varied. A metal or other electrically conductive body, for example, emits far less IR radiation than does an insulating body at a give body temperatured.

A distant observer is unable to determine whether temperature or emissivity changes cause the increase in radiated energy, unless the spectral distribution of the radiated energy is examined. Therefore, one may simulate (to an IR sensor) a change or difference in temperature of a body by changing its emissivity. Changing the conductivity of the target to simulate a temperature change is the principle underlying the operation of the invention.

Light photons incident upon the film 20 through the transparent substrate 22 are absorbed in the film 20, and result in redistributing electrons from the valence band to the conductive band, provided the photon frequency hν meets or exceeds the work function energy gap for the film material. By selectively illuminating the surface of the film 20 with the light, the film surface can be made selectively conductive in substantially the same spatial pattern as the image, since the free electrons will be lost due to recombination within the recombination length. The surface portion which is conductive will have substantially decreased emissivity.

When the photo-conductive film 20 is in an electrically conductive state, the emissivity is relatively low; whereas, when the photo-conductive film 22 is in a non-conducting state, the emissivity is relatively high. To effect changes in the state of the photo-conductive film, the film 20 is irradiated with a light image of the desired IR image by image light projector 24. The necessary spatial intensity variations of the light image are determined by the desired IR image.

The purpose of the substrate 22 is to provide a rugged support for the film 20. The substrate 22 is preferably constructed of a material having a low emissivity, or which is transparent to IR. Otherwise, were the substrate to have high emissivity, it would emit relatively large amounts of radiation detectable by the IR sensor under test, even though the film may have a low emissivity over its surface. An exemplary material suitable for fabricating the substrate 22 is potassium bromide. Commercially available material suitable for fabricating the substrate is marketed by the Eastman Kodak Company under the registered trademark "Irtran."

Exemplary constituent materials for the photo-conductive film 20 are strontium sulfide or one of the other sulfides. A preferred technique for forming the film 20 is chemical vapor deposition.

The film 20 should have thickness comparable to the skin depth or absorption length of photons at the IR wavelengths of interest. This absorption length is dependent on the material comprising the film 20 and the wavelength of incident light from the light projector 22. Typically, absorption lengths are in the range of hundreds of Angstroms. The following relationship for the absorption length L is well known for conductors.

$$L \simeq (2/\omega\mu\sigma)^{\frac{1}{2}}$$

where $\omega$ is the angular frequency of the light, $\mu$ is the magnetic permeability, and $\sigma$ is the conductivity of the material.

The light projector 24 may comprise a laser, which may, for example, be operated in a scanning (raster-like) mode to create the spatial light variations forming the visible light image. The frequency of the laser light is selected so that the energy of the laser light photons $h\upsilon$ is equal to or greater than the band gap energy of the material comprising the thin film 20. For example, if the film 20 is cadmium sulfide, the wavelength of light projected by the projector 24 should be no greater than 0.5 microns to cause photoconduction.

The light projector 24 may alternatively comprise an arc lamp and projecting optics. Still another alternative is a movie film type of projector. Use of one of these types of diffuse light sources may be preferable in some applications over a raster scanned laser source, e.g., where IR sensors are raster-scanned, thereby avoiding raster-conflict artifacts. Of course, only the light having a wavelength below that necessary to provide photons whose energy exceeds the band gap energy of the film 20 will cause photoconduction. The longer wavelength light will probably pass through the thin film 20 and would not be absorbed.

To estimate the power levels of irradiation required, consider a very simple model of the film photoconduction properties. Assuming that electron diffusion establishes uniform density through the thickness of the film, the conducting electron density in the plane of the film may be described by two equations:

CONTINUITY: $\partial n/\partial t + \beta\partial(vn) = S - \partial n(n+N)$ (1)

MOMENTUM: $mn\, \partial v/\partial t = -mv\, vn + neE - KT\nabla n$ (2)

Here n denotes the density of conducting electrons, v is their drift velocity, S is the flux of irradiating photons, $\beta$ is a recombination rate coefficient with N denoting the density of traps, e and m are the charge and mass of an electron, E is the electric field in the plane of the film, $\upsilon$ is the collision frequency, and KT denotes the thermal energy of the electron.

For S having the form $$S = S_1 e^{i(kx + \omega t)} \quad (3)$$

where x denotes a distance in the plane of the film, these equations (1) and (2) give approximately $$n \simeq (S_1 e^{i(kx+\omega t)})/(i\omega + (k^2 KT/m(i\omega+\upsilon) + V\tau) \quad (4)$$

where it is assumed that recombination is dominated by the traps and $\tau$ is written as $(\beta N)^{-1}$, and where charge neutrality with no applied field is assumed.

For $\omega < \upsilon$, $$n \simeq (S_1 e^{i(Kx+\omega t)})/(Dk^2 + 1/\tau), \quad (5)$$

where the diffusion constant D is given by $$D \simeq KT/M\upsilon = \upsilon KT/e \quad (6)$$

and where $\mu$ is the mobility. The flux S is related to the intensity I of irradiating light by $$S = \alpha I/h\omega_L tm \ (7)ps$$

where $\beta$ is the absorption coefficient in the film, h is Planck's constant divided by $2\pi$ and $\omega_L$ is an average frequency $(x2\pi)$. Assume the following typical values, $k = 10^2$ cm$^{-1}$ $D = 10^{-2}$ cm$^2$/sec $I = 100$ watts/cm$^2$ $\omega \simeq 2\pi \times 60$Hz $h\omega_L \simeq 10^{-12}$ erg $\tau\delta 10^{-}$sec For these assumed values, $n \simeq 2 \times 10^{23}$ cm$^{-3}$. Since this density is comparable to the original densities of valence electrons, this suggests that large emissivity changes are achievable with reasonable irradiation levels, and that spatial resolution and response times are good.

The dynamic IR target can be operated in several different modes. For instance, if high temperature targets are to be simulated, the substrate is heated to the desired temperature and the photo-conductive film is kept in the conducting state by constant irradiation everywhere except at the desired target location (i.e., the light image is a negative of the desired IR image). A substrate heater 28 (FIG. 1) is employed to heat the substrate to the desired temperature. The heater 20 may take the form of an electrical heater coil of high resistance wire. Alternatively, the heating may be performed by a radiant heater by exposing the surface 22A to radiant heat, or by blowing hot air across the surface 22A of the substrate 22.

Figure 3:
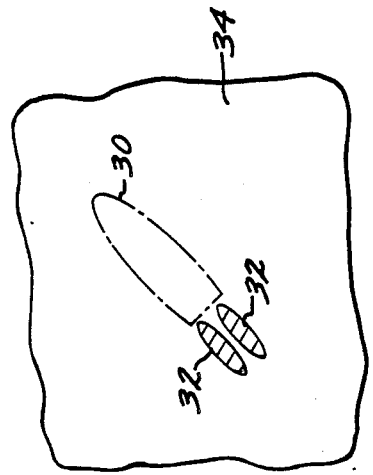
FIG. 3 is a negative light image of the target image of FIG. 2.
Figure 2:
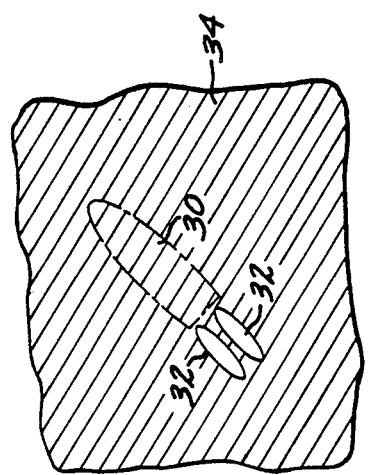
FIG. 2 illustrates an exemplary target IR image provided by the target system of FIG. 1.

FIG. 2 shows an exemplary target IR image of a rocket 30 which can be produced by the present invention. In the IR image of the rocket 30, the rocket exhaust 32 appears very bright because of its high temperature. Regin 34 shows the area surrounding the rocket and its exhaust. In FIG. 2 the dark regions are indicated by the cross-hatching, and the bright exhaust 32 is indicated by the absence of crosshatching. In the negative light image shown in FIG. 3, bright and dark regions are just reversed.

It is understood that the above-described embodiment is merely illustrative of the possible specific embodiments which may represent principles of the present invention. Other arrangements may readily be devised in accordance with these principles by those skilled in the art without departing from the scope of the invention.

What is claimed is:

1. A dynamic infrared target system for producing desired infrared images, comprising:
    an image light projector for projecting a light image representative of a desired infrared image; and
    an infrared target comprising:
        (i) a substrate transparent to infrared radiation and disposed with respect to said projected light image so that said light image impinges on a first surface of said substrate; and
        (ii) a thin film of a photo-conductive material formed on a second surface of said substrate and having a thickness comparable to the skin depth of the infrared wavelength of interest;
    whereby said light image impinges on said thin film photo-conductive material and causes a change in emissivity to occur in said thin film material.

2. The target system of claim 1 wherein said thin film comprises strontium sulfide.

3. The target system of claim 1 wherein said substrate comprises potassium bromide.

4. The target system of claim 1 wherein said system is for simulating high temperature targets, said system further comprises means for heating the substrate to the desired temperature of the target being simulated, and wherein the incident light image is a negative of the desired infrared image.

5. The target system of claim 1 wherein said light projector comprises a laser for generating a laser light beam, and wherein said thin film material is characterized by a predetermined band gap energy necessary for converting an electron from the valence band to the conductive band, and wherein said laser beam comprises photons whose energy is equal to or greater than the band gap energy.

6. The target system of claim 1 wherein said image light comprises a diffuse light source.

7. An infrared target system for producing desired infrared images, comprising:
    an image light projector for projecting a light image representative of the spatial intensity distribution of a desired infrared image;
    an infrared target comprising:
        (i) a substrate transparent to infrared radiation and disposed with respect to the projected light image so that said light image impinges on a first surface of said substrate; and
        (ii) a thin film of a photo-conductive material formed on a second surface of said substrate and having a thickness not substantially greater than the absorption length of the infrared wavelength of interest in said photo-conductive material; and
    wherein said image light projector comprises means for projecting light of one or more wavelengths selected in dependence on said photo-conductive material, so that incident light from said projector impinging on said photo-conductive material causes a change in emissivity to occur in said thin film.

8. The target system of claim 7 wherein said thin film comprises strontium sulfide.

9. The target system of claim 7 wherein said substrate comprises potassium bromide.

10. The target system of claim 7 wherein said light projector comprises a laser.

11. The target system of claim 7 wherein said light projector comprises a diffuse light source.

12. The target system of claim 7 wherein said system is for simulating high temperature targets, and further comprises means for heating the substrate to a desired temperature of the target being simulated, and wherein the incident light image is a negative of the desired infrared image.

13. An infrared target for producing desired infrared images in response to incident light representative of the desired image, comprising:
    a substrate transparent to infrared radiation and comprising a first surface; and
    a thin film of a photo-conductive material disposed on said first surface of and supported by said substrate, said film having a thickness not substantially greater than the absorption length of the infrared wavelength of interest in said photoconductive material, said photo-conductive material being characterized by a band-gap energy value,
    whereby incident light on an area of said thin film whose photon energy equals or exceeds said band-gap energy causes said film to be electrically conductive in such area, thereby substantially reducing the emissivity of the thin film in such area to simulate a lower temperature area than non-conductive areas of the film.

14. The target of claim 13 wherein said substrate comprises potassium bromide.

15. The target of claim 13 wherein said thin film comprises strontium sulfide.

* * * * *